United States Patent [19]
Förster

[11] Patent Number: 5,099,802
[45] Date of Patent: Mar. 31, 1992

[54] METHOD OF OPERATING A PISTON ENGINE AND FUEL FEEDING MECHANISM THEREFOR

[75] Inventor: Siegfried Förster, Alsdorf, Fed. Rep. of Germany

[73] Assignee: Forschungszentrum Jülich GmbH, Jülich, Fed. Rep. of Germany

[21] Appl. No.: 555,253

[22] Filed: Jul. 19, 1990

Related U.S. Application Data

[63] Continuation-in-part of Ser. No. 311,839, Feb. 16, 1989, Pat. No. 5,002,481, which is a continuation-in-part of Ser. No. 84,337, Aug. 10, 1987, abandoned.

[30] Foreign Application Priority Data

Jul. 20, 1989 [DE] Fed. Rep. of Germany ....... 3924013

[51] Int. Cl.$^5$ ................. F02B 47/02; F02M 25/02; F02M 67/06
[52] U.S. Cl. ................. 123/25 F; 123/25 D; 123/25 P
[58] Field of Search ............. 123/25 A, 25 P, 25 D, 123/25 E, 25 F, 25 B, 25 C

[56] References Cited

U.S. PATENT DOCUMENTS

| | | | |
|---|---|---|---|
| 4,412,512 | 11/1983 | Cottell | 123/25 D |
| 4,589,377 | 5/1986 | Van Dal | 123/25 P |
| 4,909,192 | 3/1990 | Förster et al. | 123/25 C |

FOREIGN PATENT DOCUMENTS

| | | | |
|---|---|---|---|
| 26175 | of 1904 | United Kingdom | 123/25 D |
| 26176 | of 1904 | United Kingdom | 123/25 D |

OTHER PUBLICATIONS

Automotive Handbook, 2nd English Edition, Robert Bosch GmbH, Stuttgart, Germany, pp. 298–300 and 332–333, 1986.

*Primary Examiner*—Andrew M. Dolinar
*Attorney, Agent, or Firm*—Frishauf, Holtz, Goodman & Woodward

[57] ABSTRACT

A combustible fuel vapor/steam mixture is fed to a piston engine through an injection valve (12). The mixture is generated by feeding water through a water pump (5) and magnetic valve into a vaporizer (1) which makes superheated steam and feeding liquid fuel through a fuel pump (4) and magnetic valve for injection into the superheated steam. The resulting mixture can be finely adjusted by an electronic control (32) which regulates the pumps and valves. The injection valve (12) injects the mixture into pre-compressed combustion air in the cylinder, and the electronic control adjusts the injection period according to the desired engine power and speed. Preferably, the injection valve closes as soon as compression pressure equals vapor mixture pressure, but the injection period is varied by changing the opening instant of the valve. The valve opens at crank angle GAMMA$_a$ and closes at angle GAMMA$_z$. As engine speed increases, injection time is held constant by setting opening angle GAMMA$_a$ earlier in the (shorter) cycle. Preferably, the injection valve is magnetically actuated by an armature (34) and coils (35) controlled by control device (32). The valve is heated by exhaust gas from the piston engine (14).

14 Claims, 3 Drawing Sheets

METHOD OF OPERATING A PISTON ENGINE AND FUEL FEEDING MECHANISM THEREFOR

This application is a continuation-in-art of U.S. Ser. No. 07/311,839 filed Feb. 16, 1989, now U.S. Pat. No. 5,002,481, issued Mar. 26, 1991, which in turn is a continuation-in-part of U.S. Ser. No. 07/084,337 filed Aug. 10, 1987 now abandoned.

Cross-reference to related patent, the disclosure of which is hereby incorporated by reference: U.S. Pat. No. 4,909,192, METHOD AND CYLINDER HEAD STRUCTURE FOR SUPPLY OF FUEL INTO A PISTON ENGINE, issued Mar. 20, 1990 to Förster & Quell.

Cross-reference to commonly assigned patent application by the same inventor, the disclosure of which is hereby incorporated by reference: U.S. Ser. No. 07/555,256, filed July 19, 1990 now U.S. Pat. No. 5,054,546.

FIELD OF THE INVENTION

The present invention relates generally to a method of operating a piston engine involving feeding a pressurized mixture of steam and fuel vapor to the cylinder of a piston engine, and, more particularly to a method and apparatus for injecting this vapor mixture into pre-compressed combustion air before the piston reaches Top Dead Center (TDC). The apparatus includes a mechanism for feeding the fuel vapor/steam mixture and an electromagnetically actuated injection valve for carrying out the method.

BACKGROUND OF THE INVENTION

A co-inventor and myself have shown how to inject a pressurized fuel vapor/steam mixture into the cylinder of a piston engine. German Patent Disclosure DE-OS 37 34 346, corresponding to U.S. Pat. No. 4,909,192, discloses generating the fuel vapor/steam mixture using the heat contained in exhaust gases, and, without first mixing with combustion air, feeding the mixture directly from a vapor mixture generator to the cylinder. The fuel vapor/steam mixture is fed into pre-compressed combustion air during the compression stroke of the piston engine and is subsequently ignited in the cylinder.

The pressure necessary for injection is generated in the fuel vapor/steam mixture by supply pumps, which respectively feed the water and the liquid fuel to the vapor mixture generator.

It is significant how the feeding of the necessary fuel vapor/steam mixture is controlled. According to the known method, the pressure of the fuel vapor/steam mixture is set higher than the maximal compression pressure in the cylinder. For mixture regulation, given the variety of engine capacities and engine RPM's, a heavy investment in controls is needed, due to the need to match the opening times of the injection valves. Further, due to the high required pressure in the fuel vapor/steam mixture, the generation of the mixture becomes problematical. As pressure increases, the temperature needed for fuel vaporization increases, and when one increases the temperature in a vaporizer, one has to expect formation from the fuel of cokes and other unvaporizable fractions.

SUMMARY OF THE INVENTION

Accordingly, it is an object of the present invention to feed a fuel vapor/steam mixture to a piston engine in such a manner that (1) the mixture gets into the cylinder during the compression stroke of the cylinder, before the piston reaches Top Dead Center (TDC), and (2) control of the feeding of the mixture can be easily and simply adapted to differing engine powers and engine RPM's or speeds.

Briefly, this is achieved by adjusting the injection valve's open period in accordance with desired mixture richness. The fuel vapor/steam mixture is injected into the pre-compressed combustion air at a pressure which is lower than the highest compression pressure. Given a predetermined fuel content in the fuel vapor/steam mixture, the start of the injection is adjusted as a function of the desired degree of richness of the fuel vapor/steam/combustion air mixture in the cylinder to be ignited, and as a function of the remaining pressure difference between the pressure of the fuel vapor/steam mixture and the compression pressure within the cylinder.

According to one embodiment of the invention, the fuel vapor/steam mixture is injected into the cylinder during the compression stroke within a variable time interval corresponding the the opening time of the injection valve. The magnitude of this interval is adjusted, given a predetermined fuel content in the fuel vapor/steam mixture, as a function of the desired richness of the fuel vapor/steam/combustion air mixture in the cylinder to be ignited. The starting or valve opening instant is controllable and the ending or valve closing instant is determined by a specific pressure of the fuel vapor/steam mixture and by the course of the pressure during the compression stroke.

Thus, merely controlling or adjusting the opening instant of the injection valve suffices to adapt the apparatus to a desired change of engine capacity and engine RPM by corresponding mixture setting of the fuel vapor/steam/combustion air mixture in the cylinder to be ignited.

Advancing the opening instant feeds quantitatively more fuel into the cylinder so that, given a constant quantity of combustion air drawn in, the fuel content of the vapor mixture to be ignited rises. Conversely, the closing instant is specified, independent of fuel requirements, exclusively by the specified pressure in the fuel vapor/steam mixture. The injection valve shuts before the compression pressure exceeds the pressure of the fuel vapor/steam mixture. Thus, the pressure in the fuel vapor/steam mixture is so regulated that formation of cokes is avoided and formation of unvaporizable fuel fractions is avoided.

According to one embodiment of the invention, the closing instant of the injection valve is chosen so that the injection valve shuts whenever the pressure of the fuel vapor/steam mixture reaches the compression pressure in the cylinder. The opening instant of the injection valve is preferably selected as a function of the crankshaft angle.

In order to avoid excessively richening the fuel vapor/steam/combustion air mixture to be ignited, the maximum opening time of the injection valve is correspondingly limited.

The apparatus of the present invention is preferably supplied with its fuel vapor/steam mixture by the vaporizer described in my co-pending application identified above. It features fuel supply and water supply pumps which supply, under pressure, a vapor mixture generator, which in turn furnishes the mixture, under pressure, to the apparatus of the present invention.

From the vapor mixture generator, a vapor mixture conduit feeds the fuel vapor/steam mixture to an injection valve associated with each cylinder of the piston engine. Such apparatus is, like the aforementioned known method, disclosed in DE-OS 37 34 346 and U.S. Pat. No. 4,909,192.

For regulating the time interval for the opening period of the injection valve, the apparatus features an electromagnetically controllable magnetic valve. For metering of the amounts of fuel and water, in the course of feeding liquid fuel and water to the vapor generator, the apparatus features magnetic valves controlled by the RPM of the motor. The electrical or electronic controllability of the magnetic valves permits exact adjustment of the fuel vapor/steam mixture to quickly varying requirements of engine power and engine speed. The preferred magnetic valves, for use as injection valves, are those with opening periods in the range between about 5 milliseconds and about 10 milliseconds.

The pressure in the vapor mixture conduit connected to the injection valves is preferably adjustable between a maximum pressure, which is lower than the maximum pressure in the cylinder at full loading, and a minimum pressure, which is a bit below the maximum pressure in the cylinder during idling operation or upon starting of the engine. The pressure for feeding of fuel and water is generated by the fuel pump and the water pump which supply the liquid fuel and the necessary amount of water to the vapor mixture generator. Both pumps can be adjusted to produce a pressure in the range between 5 and 20 bar (atmospheres) in the fuel and water supply lines.

It is important that the vapor mixture generated in the vapor mixture generator does not cool off and partially recondense during its flowpath to the cylinder. In order to avoid this, it is desirable to heat the injection valve with the exhaust gas of the piston engine. For engine start-up, one can provide as a supplement another source of heating gas. When using the engine exhaust gas for warming the injection valves, it is desirable to first pass the exhaust gas past the vapor mixture generator, to warm it.

Any residual heat of the exhaust gas, after warming of the injection valves and heat transfer in the vapor mixture generator, can be used in a recuperator for generating warm air or warm water. In the recuperator, the exhaust gas is cooled to below the dewpoint of the water vapor contained in the gas. It is desirable to recycle this water for use in formation of the fuel vapor/steam mixture.

The invention will be described below, with examples which illustrate further features of the invention, particularly an electromagnetically controllable injection valve for carrying out the method.

DRAWINGS

DETAILED DESCRIPTION

Figure 1:
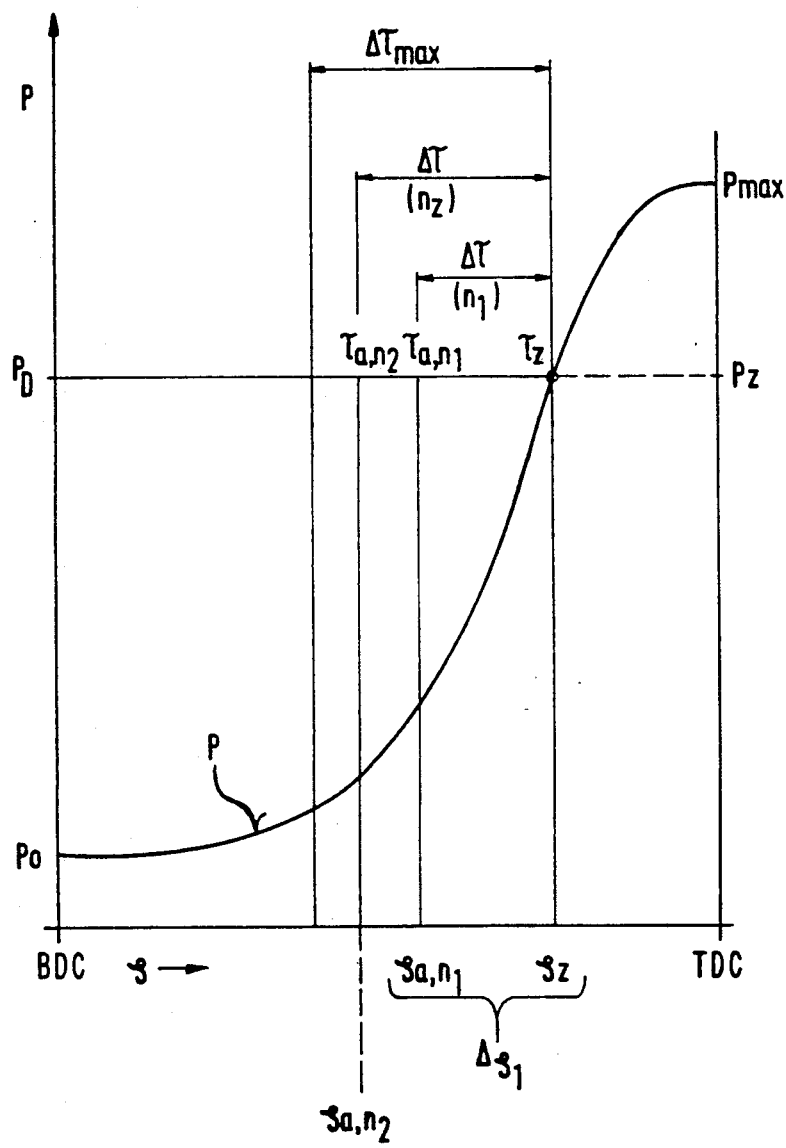
FIG. 1 is a graph of crank angle, on the horizontal axis, against pressure, on the vertical axis, representing the injection of the fuel vapor/steam mixture, showing the course of the compression pressure P during the compression stroke of a piston engine.

FIG. 1 illustrates the injection of the fuel vapor/steam mixture into the cylinder of a piston engine during the compression stroke. FIG. 1 is a graph of compression pressure P against crankshaft position. The crankshaft angle GAMMA is used for the crankshaft position. The compression pressure P rises, from Bottom Dead Center (BDC) to Top Dead Center (TDC), exponentially from a bottom compression pressure $P_o$ to a maximum compression pressure $P_{max}$.

According to a first embodiment, a vapor mixture pressure $P_D$ is specified for the fuel vapor/steam mixture being generated. Vapor mixture pressure $P_D$ is smaller than maximum pressure $P_{max}$. The value of vapor mixture pressure $P_D$ determines the closing time or instant $t_z$ for the injection valve. The closing instant is so chosen that, upon closing of the injection valve, the vapor mixture pressure $P_D$ is greater than or equal to compression pressure $P_Z$. The graph of FIG. 1 illustrates a situation in which, upon closing of the injection valve, vapor mixture pressure $P_D$ equals compression pressure $P_Z$. Taking as a given the closing time $t_z$, the opening instant or time $t_a$ of the injection valve must also be determined. The open period delta t of the injection valve (delta $t = |t_a - t_z|$) depends upon the necessary richness of the fuel vapor/steam/air mixture. Given a predetermined fuel component in the fuel vapor/steam mixture and a predetermined combustion air volume sucked in during the piston inlet stroke, the open period must be matched to the desired change in the degree of richness; if the opening instant is made later with respect to Top Dead Center (TDC), that means the open period is to be shortened; conversely, to increase the richness, the open period should be lengthened. To avoid overenrichment of the fuel vapor/steam/air mixture, the open period must be limited to a maximum value delta $t_{max}$.

Letting the degree of richness determine the open period, and having already determined the closing instant $t_z$, the opening instant $t_a$ is therefore also determined. FIG. 1 has a horizontal axis representing the crank angle GAMMA from Bottom Dead Center (BDC) to Top Dead Center (TDC) and shows the opening and closing of the injection valve with respect thereto. The condition that compression pressure P equal pressure $P_D$ of the fuel vapor/steam mixture determines the crank angle position $GAMMA_z$ for the closing time $t_z$, and the aforementioned magnitude of open period delta t, together indicate by simple subtraction what the injection valve opening angle $GAMMA_a$ must be.

The fact that the engine power determines the magnitude of the open period delta t requires adjustment, according to the engine RPM, of the opening of the injection valve at a different crank angle position. At high RPM, the injection valve must be opened at an earlier crank angle position so that, despite the higher RPM, the same open period delta t can be achieved and the same amount of fuel can be introduced.

FIG. 1 illustrates that at an engine RPM or speed n1, the open period covers a crank angle range delta GAMMA' from opening angle $GAMMA_{a'n1}$ for an open period $t_{a'n1}$ until a closing time $t_z$ at crank angle $GAMMA_z$. Increasing engine speed to n2, where n2 is greater than n1, and keeping the same closing instant $t_z$ and closing crank angle $GAMMA_z$, each cycle takes less time, so to keep the open period the same, the open period must take up more of a cycle. The injection valve must open at an earlier crank angle $GAMMA_{a'n2}$ corresponding to an earlier opening time $t_{a'n2}$ relative to the (now shortened) cycle as a whole. Since a given magnitude of delta t corresponds to a specific fuel amount and thus to a specific engine power, keeping the same closing time $t_z$ but varying the delta t period (and opening angle $GAMMA_a$) permits adjustment of the engine power.

The vapor pressure of the fuel vapor/steam mixture is matched to the compression pressure in the cylinder. At high engine power, $P_D$ can be correspondingly high, while at lower engine power, $P_D$ can be correspondingly low. In any case, $P_o$ is always kept lower than the maximum pressure $P_{max}$ in the cylinder. If one operates with constant fluid pressure for feeding of fuel and water to the vapor mixture generator and keeps the injection starting instant constant, the engine cannot turn through arbitrarily, e.g. upon drop in load, since the combination of dropping load and increasing RPM makes the effective injection time ever smaller and the amount of fuel fed corresponds. Therefore, the vapor mixture pressure $P_D$ must not exceed the maximum cylinder pressure.

Figure 2:
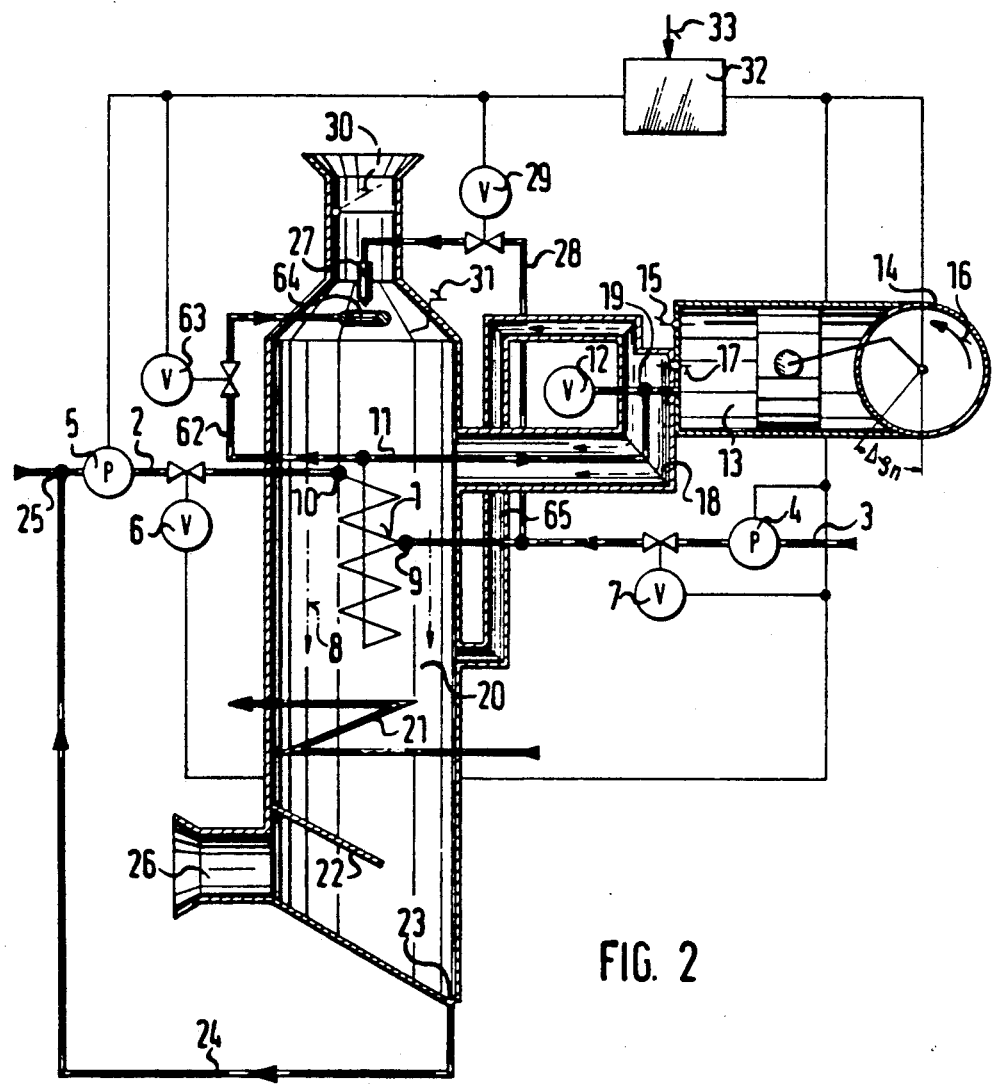
FIG. 2 illustrates an apparatus for feeding of the fuel vapor/steam mixture.

FIG. 2 illustrates schematically an apparatus for carrying out the method of the present invention. See also my companion German application P 39 24 012 and corresponding U.S. application Ser. No. 07/555,256, filed July 19, 1990 now U.S. Pat. No. 5,054,546 referenced col. 1 above. For generation of a fuel vapor/steam mixture, there is provided a vapor mixture generator 1 fed by a water supply line 2 with water to be vaporized and by a fuel supply line 3 with liquid fuel. The fuel is fed from a fuel tank (not shown in FIG. 2) and the water is fed from a water tank (also not shown). For metering of the water and fuel amounts, there are provided clocked magnetic valves, a magnetic valve 6 for the feeding of water and a magnetic valve 7 for feeding of fuel. The valves are electromagnetically driven and are pulsed or clocked at a frequency set to a specific value. For example, one can keep constant pressure upstream of valves 6 and 7 and feed more or less fuel vapor/steam mixture by changing the clocking frequency, or one can keep the clocking frequency constant and feed more or less water and fuel by changing the pressures. Thus, in this case, changes in engine loading require no special regulation for supplying the vaporizer with water and liquid fuel.

The vaporization of water and fuel in vapor mixture generator 1 utilizes waste heat from exhaust gases. FIG. 2 illustrates the exhaust gas flow by (downward) arrow 8. In vapor generator 1, the vaporization occurs with retrograde flow; water and fuel both flow toward the bottom in vapor generator 1 during their vaporization. In vapor mixture generator 1, initially superheated steam is generated, then the liquid fuel is added. The fuel supply line 3 meets generator 1 at a junction 9 below the junction 10 for water supply line 2. A vapor generator of the aforementioned kind is disclosed in German patent DE-PS 36 26 933.

Such a structure permits avoidance of cracking products and changes in fuel consistency upon vaporization.

The fuel vapor/steam mixture generated in the vapor generator 1 is fed through a conduit 11 to an injection valve 12, for which a electromagnetically controllable magnetic valve is provided. Upon opening of the injection valve 12, the fuel vapor/steam mixture flows into the cylinder 13 of a piston engine 14. During the compression stroke of the piston engine, pre-compressed air is introduced. During the intake stroke of the piston, intake valve 15 is open and air is drawn from the ambient air through an air filter (not shown in FIG. 2). A crank angle range delta $GAMMA_n$, during which injection valve 12 is open for feeding of fuel vapor/steam mixture during the compression stroke, is schematically illustrated in FIG. 2 by a rotation arrow at piston engine 14. Arrow 16 indicates the rotation direction of the crankshaft of the piston engine. In the preferred embodiment, injection valve 12 opens before Top Dead Center (TDC) at various crank angles within a range from about 180° before TDC to about 20° before TDC.

The fuel vapor/steam/combustion air mixture formed in cylinder 13 is ignited in the cylinder. The necessary ignition devices are conventional and therefore are not shown in FIG. 2. The exhaust gas resulting from combustion of the vapor mixture is, after opening of outlet valve 17, exhausted into an exhaust pipe 18. The exhausted gas flows around injection valve 12, a junction 19 for the vapor mixture conduit 11, and finally a portion of conduit 11 located within exhaust tube 18, until it reaches an exhaust channel 20 in which the vapor mixture generator 1 is located. Exhaust pipe 18 is shown schematically in FIG. 2. One can also feed only a portion of the exhaust gas through the injection valve. In that case, only a bypass of exhaust pipe 18 leads to injection valve 12, and the exhaust gas flows thus either directly to vapor mixture conduit 11 or into exhaust channel 20 behind vapor mixture generator 1.

After heat exchange at vapor generator 1, the portion of the exhaust gas which flowed past the vapor generator and the remainder of the exhaust gas is fed to a recuperator 21 for production of warm air or warm water. In recuperator 21, the exhaust gas cools to below the dewpoint of the water vapor it contains. The recuperator therefore comprises non-corroding material, preferably ceramic. The water condensing in the recuperator is captured on a condensate plate 22 and drawn off via a condensate outlet 23 and a condensate conduit 24. In the preferred embodiment, the condensate conduit 24 leads back to water supply line 2 and meets at junction 25 with the intake of water pump 5. For generation of the fuel vapor/steam mixture, one can use, if necessary, desalinated water, to avoid calcium deposits in the system.

The dried exhaust gas flows through an exhaust gas outlet 26 into the environment.

In the preferred embodiment, a fuel nozzle 27 is provided, above vapor mixture generator 1, and serves to generate a combustible fuel-droplet spray whenever there is, as yet, no exhaust gas from the piston engine for generation of the fuel vapor/steam mixture. A fuel branch line 28 branches off from fuel supply line 3 and has a starting valve 29 which is opened for feeding of fuel to fuel nozzle 27 during startup. The combustion air necessary for combustion is fed by a blower (not shown) by opening a throttle 30. The mixture is ignited by an electrical ignition device 31.

Once sufficient warming of the vapor mixture generator 1 occurs and a usable fuel vapor/steam mixture is available, this vapor mixture is combusted in a chamber above the vapor mixture generator and the fuel nozzle 27 is shut down. The fuel vapor/steam mixture can be fed, not only to injection valve 12, but also through a branch line 26 through a choke valve 63 to a ring nozzle 64 and combusted there with inflowing combustion air. The thus-generated hot gas serves for further warming of the injection valve and of the vapor mixture conduit until the engine starts. The hot gas flows in exhaust pipe 2 in a direction opposite that of the stream shown in FIG. 2, and, after flowing through the injection valve, is fed in a return line 65 back into exhaust channel 20, where it enters upstream of recuperator 21, seen in the direction of flow of the hot gas.

The entire apparatus is controlled by a control device 32, (which may suitably be any commercially available microprocessor) which receives input signals 33, including engine power and speed, and controls all regulating functions and corresponding elements, e.g. the fuel pump 4 and clocked magnetic valve 6 for fuel feeding, the water pump 5 and clocked magnetic valve 7 for water feeding, and the open period of injection valve 12 as a function of engine RPM n, and controls the start-up procedure.

In the preferred embodiment, the pressures generated by fuel pump 4 and water pump 5 can be set in a range between about 5 and about 20 bar (atmospheres). By corresponding regulation of the pumps and the magnetic valves by means of control device 32, the vapor mixture pressure in the vapor mixture conduit can be adjusted to satisfy requirements.

For metering of the fuel vapor/steam mixture to match the require engine power, the injection valve 12 has an open period in the range from about 5 millisecond to about 10 milliseconds.

Figure 3:
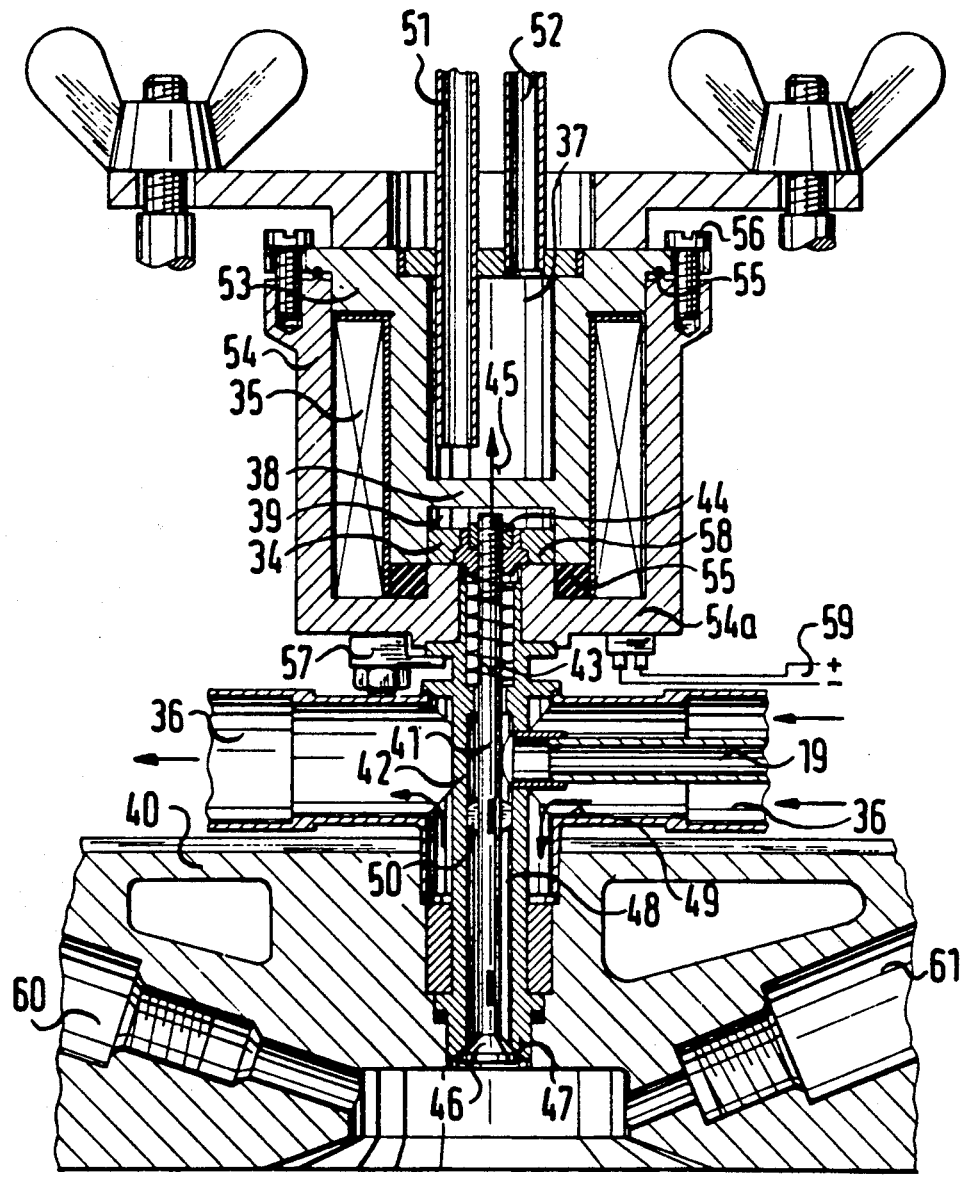
FIG. 3 illustrates an electromagnetically actuated injection valve for performing the method of the invention.

FIG. 3 illustrates an electromagnetically actuated injection valve suitable for carrying out the method of the invention. Elements which were shown schematically in FIG. 2 bear the same reference numbers in FIG. 3.

Significant features of the construction of the electromagnetic injection valve are, first, the warming of the flow chambers of the fuel vapor/steam mixture flowing to the cylinder and, second, the cooling of magnetic armature 34 and magnetic coils 35, which must not be overheated. To these ends, the injection valve features, first, a connection 19 for the vapor mixture conduit 11 within a heating medium conduit 36, and, second, at least one cooling medium chamber 37 which is arranged in heat-conductive relation to magnetic armature 34 and magnetic coils 35. In the preferred embodiment, the cooling medium chamber 37 is located centrally between magnetic coils 35 and extends to a floor 38 adjacent a magnetic armature chamber 39, in which the magnetic armature moves during operation of the magnetic coils 35. FIG. 3 illustrates the position of magnetic armature 34 when the injection valve 12 is open.

Magnetic armature chamber 39 lies within the operating range of the magnetic field created by operation of the magnetic coils 35. Preferably, the field is so arranged in the edge regions of magnetic coils 35 that a sufficient dimensioning of cooling medium chamber 37 is possible. The magnetic armature chamber 39 is located on the end of magnetic coils 35 adjacent the cylinder cover 40.

Magnetic armature 34 clamps on a valve stem 41 which rides in a valve stem race or tube 42. Magnetic armature 34 is fastened to valve stem 41 between a valve spring 43 and a locknut 44. The spring force of valve spring 43 operates, in the embodiment shown, in the closing direction 45 of the injection valve, opposite the magnetic force. The magnetic force is arranged to be less than the spring force.

At the armature-remote end of valve stem 41, there is fastened a valve plate 46, in this embodiment a valve cone or poppet, which, when the injection valve is closed, is pressed by valve spring 43 against a valve seat 47. Valve plate 46 closes an internal conduit 48 for the fuel vapor/steam mixture, which conduit opens into connection 19. In the embodiment shown, connection 19 and conduit 48 in the injection valve form the flow chamber to be heated for the fuel vapor/steam mixture.

In the same manner as connection 19, in the embodiment shown, the internal conduit 48 for the fuel vapor/steam mixture is also surrounded by heating medium conduit 36, which surrounds conduit 48 almost to the end of conduit 48 and valve seat 47. In heating medium conduit 48 are placed flowguides (not shown) which direct heating medium flowing in conduit 48 in flow direction 49 up to the region of valve seat 47. In the preferred embodiment, the engine exhaust gas is used as the heating medium. Heating medium conduit 36 is, contrary to FIG. 2, not connected with exhaust pipe 18, but rather with return line 65. After traversing the injection valve, the exhaust gas is fed via return line 65 into exhaust channel 20, as shown in FIG. 2.

Valve stem 41 is guided in valve stem race 42 within conduit 48. Winglike guides 50, which glide along the inner wall surface of valve stem race 42, serve this purpose.

The free flow cross-section in connection 19 and in conduit 48 is larger than the flow cross-section between valve plate 46 and valve seat 47 at maximum opening of the injection valve. The guides 50 for the valve stem leave a correspondingly large free cross-section.

For cooling of magnetic armature 34 and magnetic coils 35, the preferred embodiment of the present invention uses water. The cooling medium flows into cooling medium chamber 37 via an inlet 51 and out via an outlet 52. In the embodiment shown, the cooling medium chamber 37 is located in an inner part of a magnetic coil housing, which part takes the form of a cover 53. An outer portion 54 of the housing, in which the magnetic coils 35 are located, is closed by the cover 53. Seals 55 of a non-magnetic material are placed between housing portion 54 and cover 53. Cover 53 is secured onto housing portion 54 by securing screws 56.

Outer housing portion 54 of the magnetic coil housing is fastened securely to valve stem tube 42 by means of holddown 57. The holddown is screwed onto outer housing portion 54 and is tensioned in interlocking relation to valve stem tube 42.

Valve stem tube 42 is shaped at the fastening point of the magnetic coil housing in such a way that heat conduction, between the hot region of the injection valve for introduction of the fuel vapor/steam mixture, on the one hand, and the magnetic coil housing to be cooled, on the other hand, is rendered difficult. In the preferred embodiment, this is achieved by minimizing the material cross-section of the valve stem tube 42 there.

In order to ease the movement of magnetic armature 34 within magnetic armature chamber 39 and to minimize resistance to movement of magnetic armature 34 in the chamber, which may be filled with condensate or fuel and steam, the magnetic armature 34 has apertures 58 for passage of condensate. Current leads 59 to the magnetic coils 35 are located in outer housing portion 54, particularly in base region 54a of the outer housing.

Cylinder head 40 is formed with not only the mouth of the injection valve but also an inlet valve 60 for combustion air, and an outlet valve 61 for exhaust gas formed after ignition of the fuel vapor/steam/combustion air mixture.

The spring force of valve spring 43 is appropriately chosen for closing of the injection valve. The spring force is greater than the vapor pressure due to the action of the vapor mixture pressure $P_D$ on valve plate 46. Further, the spring force is, as previously noted, stronger than the oppositely directed magnetic force. In this manner, the injection valve shuts by itself, whenever the resulting force due to compression pressure operating on the valve plate in spring-force direction equals or exceeds the resulting force due to the oppositely-directed vapor mixture pressure and magnetic forces which hold the valve open. Thus, the injection valve can always close, depending upon the magnetic force, even before the compression pressure reaches the vapor mixture pressure.

I claim:

1. Method of operating a piston engine by feeding into a cylinder a pressurized mixture of fuel vapor and steam and combining said mixture with pre-compressed combustion air before a piston in said cylinder reaches Top Dead Center (TDC),
    comprising the steps of
    injecting said fuel vapor/stream mixture into pre-compressed combustion air at a mixture pressure less than a maximum compression in said cylinder, and
    given a predetermined fuel percentage content in said fuel vapor/steam mixture, selecting an injection valve opening instant as a function of desired richness of a fuel vapor/steam/air mixture to be ignited in said cylinder and as a function of any pressure differential between pressure in said pressurized mixture and compression pressure in said cylinder.

2. Method according to claim 1,
    further comprising the steps of
    fixing an injection valve closing instant in accordance with relative pressure of said fuel vapor/steam mixture and compression pressure during a compression stroke of said piston, and
    varying said injection valve opening instant in accordance with desired richness of a fuel vapor/steam/air mixture to be ignited in said cylinder.

3. Method according to claim 2,
    wherein said step of fixing said injection valve closing instant comprises
    closing said injection valve as soon as compression pressure in said cylinder rises to equal said pressure in said fuel vapor/steam mixture.

4. Method according to claim 1, further comprising adjusting said injection valve closing instant as a function of crank angle position of said cylinder.

5. Method according to claim 2, further comprising adjusting said injection valve closing instant as a function of crank angle position of said cylinder.

6. Method according to claim 3, further comprising adjusting said injection valve closing instant as a function of crank angle position of said cylinder.

7. Method according to claim 1, further comprising, limiting a maximum open period of said injection valve to correspond to a maximum desired richness of said fuel vapor/steam/air mixture.

8. Method according to claim 2, further comprising, limiting a maximum open period of said injection valve to correspond to a maximum desired richness of said fuel vapor/steam/air mixture.

9. Apparatus, for injecting a pressurized fuel vapor/steam mixture into pre-compressed combustion air in a cylinder (13) of a piston engine (14) before a piston in said cylinder reaches Top Dead Center (TDC), having
    a vapor mixture generator (1);
    a mixture injection valve (12); and
    a vapor mixture conduit (11) leading from said generator to said injection valve (12);
    wherein
    said vapor mixture generator (1) includes a fuel pump (4) and a water pump (5) feeding fuel and water thereto under pressure via respective supply lines (2,3);
    a respective magnetic control valve (6,7) is located in each of said supply lines; and
    said injection valve (12) is a controllable magnetically actuated valve.

10. Apparatus according to claim 9,
    wherein said injection valve has an open period lasting between 5 milliseconds and 10 milliseconds.

11. Apparatus according to claim 9,
    wherein said pumps generate a pressure in a range between 5 and 20 atmospheres.

12. Apparatus according to claim 9,
    further comprising
    means for heating said injection valve (12) by heat exchange with exhaust gas from said engine (14).

13. Apparatus according to claim 12,
    further comprising
    means for feeding said exhaust gas, after said heat exchange with said injection valve (12), into heat exchange relation with said vapor generator (1).

14. Apparatus according to claim 13, further comprising
    a recuperator (21) receiving said exhaust gas from said vapor generator (1) and cooling said exhaust gas to a temperature below dewpoint of water vapor contained therein, thereby condensing said water vapor.

* * * * *